United States Patent
Kim

(10) Patent No.: US 7,767,038 B2
(45) Date of Patent: Aug. 3, 2010

(54) LOW-NICKEL AUSTENITIC STAINLESS STEEL AND METHOD FOR PRODUCING SAME

(75) Inventor: Hyunku Kim, Qingdao (CN)

(73) Assignee: Qingdao Samkyung Metals Co., Ltd. (CN)

( * ) Notice: Subject to any disclaimer, the term of this patent is extended or adjusted under 35 U.S.C. 154(b) by 0 days.

(21) Appl. No.: 11/868,274

(22) Filed: Oct. 5, 2007

(65) Prior Publication Data

US 2009/0022617 A1 Jan. 22, 2009

(30) Foreign Application Priority Data

Jul. 18, 2007 (CN) .................. 2007 1 0119205

(51) Int. Cl.
*C22C 38/02* (2006.01)
*C22C 38/08* (2006.01)
*C22C 38/18* (2006.01)
*C22C 38/38* (2006.01)
*C22C 38/42* (2006.01)
*C22C 38/58* (2006.01)

(52) U.S. Cl. .................. 148/326; 148/332; 148/336; 148/337

(58) Field of Classification Search .................. 148/326, 148/332, 336, 337
See application file for complete search history.

(56) References Cited

U.S. PATENT DOCUMENTS 3,926,685 A * 12/1975 Gueussier et al. ........... 148/506

FOREIGN PATENT DOCUMENTS

| CN | 1772942 | 5/2006 |
|---|---|---|
| DE | 3742539 | 7/1989 |
| DE | 3825634 | 2/1990 |
| EP | 1215298 A2 * | 6/2002 |
| GB | 2205856 | 12/1988 |
| JP | 01205064 | 8/1989 |
| JP | 6-86645 | 2/1994 |
| JP | 2001279390 | 10/2001 |
| JP | 2001279390 A * | 10/2001 |

OTHER PUBLICATIONS

Machine translation of JP 2001-279390 published Oct. 2001.*
German Patent Office, Office Action, Dec. 6, 2008, 3 pgs., Germany.
Chinese Patent Office, Office Action, Aug. 14, 2009, 4 pgs., China.

* cited by examiner

*Primary Examiner*—George Wyszomierski
*Assistant Examiner*—Tima M McGuthry-Banks
(74) *Attorney, Agent, or Firm*—McAndrews, Held & Malloy, Ltd.

(57) ABSTRACT

A low-nickel austenitic stainless steel is provided which comprises by weight: $\leq 0.08\%$ C, 4.0~5.0% Mn, 0.7~1.0% Si, 3.5~4.5% Ni, 16.0~18.0% Cr, 3.0~3.50% Cu, $\leq 0.045\%$ S, $\leq 0.030\%$ P, impurity elements in the total amount of $\leq 0.2\%$, and Fe as the balance. This low-nickel austenitic stainless steel has decreased nickel content, but retains excellent mechanical properties and corrosion resistance property. Therefore, the cost for producing the stainless steel can be reduced remarkably. The method for producing the low-nickel austenitic stainless steel is also provided.

7 Claims, No Drawings

LOW-NICKEL AUSTENITIC STAINLESS STEEL AND METHOD FOR PRODUCING SAME

RELATED APPLICATIONS

This patent application makes reference to, claims priority to and claims benefit from Chinese Patent Application No. 200710119205.1 filed on Jul. 18, 2007. The disclosure of this Chinese Patent Application is incorporated herein by reference in its entirety.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

The presently described technology relates to a low-nickel austenitic stainless steel and method for producing same. More particularly, this invention relates to an austenitic stainless steel retaining excellent mechanical properties and corrosion resistance with low-nickel level, and method for producing the same.

In recent years, the commercially available stainless steels are mainly 300 series and 200 series between which there is a difference in the level of element nickel that results in an obvious difference in their properties and cost.

The 300 series is known as chromium-nickel stainless steel, of which the typical steel grade is 304 stainless steel characterized by the basic composition of 18Cr-8Ni. The 200 series is known as chromium-manganese stainless steel, of which the typical steel grade is 201 stainless steel characterized by the basic composition of 17Cr-5Ni-7Mn. The 200 series is also known as nickel-saving stainless steel, in which a part of nickel is replaced by manganese. Although the 200 series is low-priced, they have decreased corrosion resistance, improved tensile strength and elevated cold work hardening rate as compared to the 300 series, which result in elevated cost of casting's cold working.

Nickel resource is so rare that it exists naturally only in about 15 countries in the world. It is, therefore, necessary to develop an austenitic stainless steel having sufficient properties and decreased nickel content, so as to save nickel, reduce casting production cost and improve commercial competitiveness.

For this reason, a low-nickel austenitic stainless steel STC204Cu based on chromium-manganese stainless steel 201 has been developed by the inventors and used in investment casting, in order to improve corrosion resistance and cold work formability of Alloy 201.

BRIEF SUMMARY OF THE INVENTION

One object of the presently described technology is to provide an economical and low-nickel austenitic stainless steel with excellent mechanical properties and corrosion resistance.

Another object of the presently described technology is to provide a method for producing the low-nickel austenitic stainless steel.

The low-nickel austenitic stainless steel of the invention (referred to as "STC204Cu" hereafter) comprising by weight:

| | |
|---|---|
| C | ≦about 0.08% |
| Mn | about 4.0~5.0% |
| Si | about 0.7~1.0% |
| Ni | about 3.5~4.5% |
| Cr | about 16.0~18.0% |
| Cu | about 3.0~3.50% |
| S | ≦about 0.045% |
| P | ≦about 0.030% |
| total amount of impurity elements | ≦about 0.2% |
| Fe | balance. |

In a preferred embodiment of the invention, the composition of STC204Cu is as follows:

| | |
|---|---|
| C | ≦about 0.06% |
| Mn | about 4.0~4.5% |
| Si | about 0.7~1.0% |
| Ni | about 4.0~4.2% |
| Cr | about 17~17.5% |
| Cu | about 3.0~3.2% |
| S | ≦about 0.045% |
| P | ≦about 0.030% |
| total amount of impurity elements | ≦about 0.2% |
| Fe | balance. |

In accordance with one embodiment of the presently described technology, the method for producing the stainless steel STC204Cu comprises steps of: providing metallic raw materials (charge calculation), smelting the metallic raw materials in an electric furnace to form a composition, on-the-spot sample analyzing composition, adjusting the composition according to the analysis result, regulating the temperature of the composition, pouring the composition, and heat-treating the composition.

Advantageous Effects

The low-nickel austenitic stainless steel STC204Cu in accordance with at least one embodiment of the presently described technology has a reduced nickel level, lower material cost, corresponding work hardening behavior and processing cost as compared to usual stainless steel 304. After being heat treated, the STC204Cu in accordance with at least one embodiment of the presently described technology has improved strength and corresponding corrosion resistance while cost is lower as compared to stainless steel 304.

Expensive stainless steel 304 may be replaced by STC204Cu in the applications for architectural hardware, household goods, cookware and hardware for bath, such as glass wall claws, handles of window and door, handles of window or door lock, chaining, fastener, handles of tableware etc., and metallic harness, for example stirrup, bit, spur and the like in general operating environment (not more than 400° C. of operating temperature, medium corrosion environment and below).

BRIEF DESCRIPTION OF SEVERAL VIEWS OF THE DRAWINGS

[Not Applicable]

DETAILED DESCRIPTION OF THE INVENTION

Based on the composition of stainless steel 201, copper is added to avoid the trouble of cold working on conventional chromium-manganese stainless steel, furthermore, carbon level is decreased and the proportion among silicon, manganese, chromium, nickel and carbon is adjusted so as to improve corrosion resistance and weldability of the alloy.

In accordance with some embodiments, the composition of low-nickel austenitic stainless steel STC204Cu of the present technology comprises by weight:

| | |
|---|---|
| C | ≦about 0.08% |
| Mn | about 4.0~5.0% |
| Si | about 0.7~1.0% |
| Ni | about 3.5~4.5% |
| Cr | about 16.0~18.0% |
| Cu | about 3.0~3.50% |
| S | ≦about 0.045% |
| P | ≦about 0.030% |
| total amount of impurity elements | ≦about 0.2% |
| Fe | balance. |

In some preferred embodiments of the presently describe technology, the composition of STC204Cu is as follows:

| | |
|---|---|
| C | ≦about 0.06% |
| Mn | about 4.0~4.5% |
| Si | about 0.7~1.0% |
| Ni | about 4.0~4.2% |
| Cr | about 17~17.5% |
| Cu | about 3.0~3.2% |
| S | ≦about 0.045% |
| P | ≦about 0.030% |
| total amount of impurity elements | ≦about 0.2% |
| Fe | balance. |

A comparison of the compositions of STC204Cu of the present technology, stainless steel 201 and 304 are listed in table 1 below.

TABLE 1

Comparison of Compositions

Chemical analysis wt. %

| Material | C | Mn | Si | Ni | Cr | Cu | S | P | Fe |
|---|---|---|---|---|---|---|---|---|---|
| STC204Cu | ≦0.08 | 4.0~5.0 | 0.7~1.0 | 3.5~4.5 | 16.0~18.0 | 3.0~3.5 | ≦0.045 | ≦0.030 | balance |
| 201 (ASTM) | ≦0.15 | 5.5~7.5 | ≦1.0 | 3.5~5.5 | 16.0~18.0 | | ≦0.060 | ≦0.030 | balance |
| 304 (ASTM) | ≦0.08 | 2.0 | 1.0 | 8.0~10.0 | 18.0~21.0 | | ≦0.045 | ≦0.030 | balance |

In providing metallic raw materials, the use of stainless steel 430 scrap having low carbon content can be helpful for achieving object of the presently described technology. Otherwise, more expensive pure iron, for example, needs to be added to adjust the proportion frequently with increased cost. The amounts of starting materials can be calculated on the basis of the constituent proportion of the low-nickel austenitic stainless steel of the presently described technology.

During the smelting in an electric furnace, in accordance with one embodiment, the charge is fed in proper order of 430 stainless steel scrap, nickel block and electrolytic manganese; and ferrochrome and copper are fed into the furnace after the charge has been melt. The molten steel is subject to deoxidation after intense stirring, and then the composition and temperature are regulated for pouring.

During the smelting, in accordance with one embodiment of the present technology, skimming and deoxidizing are important to achieve required molten steel and unique corrosion resistance of castings. The temperatures of deoxidizing and pouring are determined on the basis of the shape and size of castings. It is normal that deoxidizing and standing are carried out at higher temperature while pouring is carried out at lower temperature.

In accordance with some embodiments of the present technology, the heat-treatment procedure of castings can be critical for excellent combined properties, and especially, the tempering after solution treatment can be important to achieve mechanical property balance and excellent corrosion resistance. The temperature scope of high temperature tempering can be about 500-650° C. In accordance with at least one embodiment, the higher is the temperature for tempering, the better is ductility, and excellent mechanical properties can be retained while corrosion resistance is decreased in some degree (for example, endurance time decreased to 37 hr in 5% salt-fog test box at 96° C.). The process condition for heat treatment should be determined appropriately depending on the desired properties of work piece.

EXAMPLE 1

Starting metal materials were provided which had the composition of sample 001-1 shown in Table 2. The starting materials in desired proportion were charged into a smelting furnace in the sequence of: scrap of 430 steel, nickel block and electrolytic manganese. After the charge had been melt, ferrochrome and copper were added in. The molten steel was mixed at 180~220 KW power, and covered with deslagging agent after melting had been finished. The slag was raked off for the first time when the furnace temperature was raised to 1620° C. Sample analysis was carried out on the spot, and then the melt was covered with deslagging agent again. When the temperature reached about 1680° C. to about 1700° C., the melt was subject to skimming and deoxidizing at high temperature, then skimming throughout. If the composition did not need to be adjusted, the melt was covered with deslagging agent and then power supply was cut off in order to regulate temperature. If the composition should be adjusted, the proper alloying agents were added into the furnace, and then the melt was covered with deslagging agent and power supply was cut off in order to adjust the temperature.

During the period of power-off, slag was raked off for three or four times until all slag had been removed. The molten steel was poured as soon as the desired pouring temperature had been reached.

The casting was subject to heat treatment after residual mould had been removed from it. The mechanical strength and corrosion resistance measurements of the castings are listed in Tables 3 and 4, respectively, from which it is can be seen that the castings made of the low-nickel stainless steel of presently described technology have improved mechanical strength, corresponding corrosion resistance, decreased nickel level and reduced production cost as compared to stainless steel 304.

EXAMPLE 2~6

Stainless steels were produced in the same manner as Example 1, except they had different compositions (002-1, 003-1, 001-2, 002-2, 003-2) as listed in Table 2 below, and were produced at different heat-treatment conditions. The heat treatment procedure for sample 001-1 (Example 1), 002-1 (Example 2) and 003-1 (Example 3) was solution treatment followed by tempering at 570° C., while the heat treatment procedure for sample 001-2, 002-2 and 003-2 (Examples 4-6) was solution treatment followed by tempering at 620° C.

The chemical analysis listed in Table 2 are the measurements by means of a high-speed spectrum analyzer (HILGGER ANALYTICAL, made in France).

TABLE 2

Comparison of Compositions between the Samples of the Invention and the Stainless Steel 304

Chemical Analysis wt. %

| Sample No. | C | Mn | Si | Ni | Cr | Cu | S | P | impurity elements | Fe |
|---|---|---|---|---|---|---|---|---|---|---|
| 001-1 | 0.058 | 4.8 | 0.9 | 4.2 | 17.6 | 3.1 | 0.032 | 0.025 | 0.15 | balance |
| 002-1 | 0.052 | 4.6 | 0.82 | 4.3 | 18 | 3.25 | 0.030 | 0.023 | 0.17 | balance |
| 003-1 | 0.072 | 4.5 | 1.0 | 4.05 | 17.1 | 3.0 | 0.035 | 0.022 | 0.16 | balance |
| 001-2 | 0.058 | 4.8 | 0.9 | 4.2 | 17.6 | 3.1 | 0.032 | 0.025 | 0.15 | balance |
| 002-2 | 0.052 | 4.6 | 0.82 | 4.3 | 18 | 3.25 | 0.030 | 0.023 | 0.17 | balance |
| 003-2 | 0.072 | 4.5 | 1.0 | 4.05 | 17.1 | 3.0 | 0.035 | 0.022 | 0.16 | balance |
| 304 | ≦0.08 | 2.0 | 1.0 | 8.0~10.0 | 18.0~21.0 | none | ≦0.045 | ≦0.030 | | balance |

(1) Mechanical Properties

All samples, which were smelted, poured and heat treated in the same furnaces as described in Example 1, were tested by means of a tensile tester (TF-212B tensile-and-compression-testing machine, Tuo Feng Instrument Co. Ltd., Shanghai, China) and a hardness tester (TH310 Hardness Tester, Beijing, China). The rounded results are listed in Table 3.

TABLE 3

Comparison of Mechanical Properties between the Samples of the Invention and the Stainless Steel 304

| Material | Yield Strength | Tensile Strength | Ductility (%) | Hardness (HB) |
|---|---|---|---|---|
| 001-1 | 310 | 705 | 56 | 200 |
| 002-1 | 305 | 700 | 58 | 198 |
| 003-1 | 325 | 720 | 55 | 210 |
| 001-2 | 310 | 710 | 58 | 199 |
| 002-2 | 307 | 704 | 60 | 196 |
| 003-2 | 330 | 720 | 58 | 206 |
| STC204Cu | ≧300 MPa | ≧700 MPa | ≧55 | ≦210 |
| 304 | 260 MPa | 645 MPa | 60 | ≦180 |

(2) Corrosion Resistance

Three (3) sets of castings were tested on the corrosion resistance using the same corrosion testing method. The heat-treated states and compositions of six (6) samples of three (3) sets of castings were shown in Table 2, wherein the chemical compositions were measured by a high-speed spectrum analyzer (HILGGER ANALYTICAL, France). The salt-fog test was carried out for 48 hours in 5% salt-fog at temperature of 96° C. The result data on the corrosion resistance were compared between these 6 samples of the present invention and stainless steel 304. The results are shown in Table 4.

TABLE 4

Corrosion Test Results of the Samples of the Invention and the Stainless Steel 304

| Sample No. | Corrosion Time (hr) | Results | Comparative Sample 304 |
|---|---|---|---|
| 001-1 | 48 | no corrosion | no corrosion |
| 002-1 | 48 | no corrosion | no corrosion |
| 003-1 | 48 | no corrosion | no corrosion |
| 001-2 | 48 | no corrosion | no corrosion |
| 002-2 | 48 | no corrosion | no corrosion |
| 003-2 | 48 | little pitting corrosion | no corrosion |

It is known from the results that the stainless steel samples of the invention are not corroded after keeping in 5% salt-fog test box at 96° C. for 48 hours, that is, the alloy of the invention and alloy 304 have the corresponding corrosion resistance.

(3) Economic Analysis

Nickel is one very expensive rare metal. Nickel level of the nickel-saving stainless steel STC204Cu of the present technology is merely half of alloy 304 so that the material cost of STC204Cu is lower than alloy 304 (about 70% of alloy 304 cost), and its expense for casting is about 80% of alloy 304. Furthermore, STC204Cu alloy can be produced in enormous quantities, without modifications of existing equipments.

In the production of 150t/a tableware's handles, for example, the replacement of usual stainless steel 304 by nickel-saving stainless steel STC204Cu of the present technology would reduce 15% production cost, i.e. about ¥ 1,665, 000 per year.

The invention claimed is:

1. A low-nickel austenitic stainless steel, comprising by weight:

| | |
|---|---|
| C | ≦about 0.08%; |
| Mn | about 4.0~5.0%; |
| Si | about 0.7~1.0%; |
| Ni | about 3.5~4.5%; |
| Cr | about 16.0~18.0%; |
| Cu | about 3.0~3.50%; |

| | |
|---|---|
| S | ≦about 0.045%; |
| P | ≦about 0.030%; |
| impurity elements in a total amount of | ≦about 0.2%; and |
| Fe | balance. | wherein the yield strength of the low-nickel austenitic stainless steel is ≧300 MPa; the tensile strength of the low-nickel austenitic stainless steel is ≧700 MPa; the ductility of the low-nickel austenitic stainless steel is of ≧55%; and the hardness of the low-nickel austenitic stainless steel is of ≦210, and wherein the stainless steel has been thermally treated after casting by solution treatment followed by tempering.

2. The low-nickel austenitic stainless steel according to claim 1, comprising by weight:

| | |
|---|---|
| C | ≦about 0.06%; |
| Mn | about 4.0~4.5%; |
| Si | about 0.7~1.0%; |
| Ni | about 4.0~4.2%; |
| Cr | about 17~17.5%; |
| Cu | about 3.0~3.2%; |
| S | ≦about 0.045%; |
| P | ≦about 0.030%; |
| impurity elements in the total amount of | ≦about 0.2%; and |
| Fe | balance. |

3. The low-nickel austenitic stainless steel according to claim 1, comprising by weight:
about 0.058% C, about 4.8% Mn, about 0.9% Si, about 4.2% Ni, about 17.6% Cr, about 3.1% Cu, about 0.032% S, about 0.025% P, impurity elements in the total amount of about 0.15%, and Fe as the balance.

4. The low-nickel austenitic stainless steel according to claim 1, comprising by weight:
about 0.052% C, about 4.6% Mn, about 0.82% Si, about 4.3% Ni, about 18% Cr, about 3.25% Cu, about 0.030% S, about 0.023% P, impurity elements in the total amount of about 0.17%, and Fe as the balance.

5. The low-nickel austenitic stainless steel according to claim 1, comprising by weight:
about 0.072% C, about 4.5% Mn, about 1.0% Si, about 4.05% Ni, about 17.1% Cr, about 3.0% Cu, about 0.035% S, about 0.022% P, impurity elements in the total amount of about 0.016%, and Fe as the balance.

6. A low-nickel austenitic stainless steel, consisting of by weight:

| | |
|---|---|
| C | ≦about 0.08%; |
| Mn | about 4.0~5.0%; |
| Si | about 0.7~1.0%; |
| Ni | about 3.5~4.5%; |
| Cr | about 16.0~18.0%; |
| Cu | about 3.0~3.50%; |
| S | ≦about 0.045%; |
| P | ≦about 0.030%; |
| impurity elements in a total amount of | ≦about 0.2%; and |
| Fe | balance. |

7. The nickel austenitic stainless steel of claim 6, wherein its yield strength is ≧300 MPa; its tensile strength is ≧700 MPa; its ductility is of ≧55%; and its hardness is of ≦210, and wherein the stainless steel has been thermally treated after casting by solution treatment followed by tempering.

* * * * *